United States Patent [19]
Viertel et al.

[11] Patent Number: 5,203,623
[45] Date of Patent: Apr. 20, 1993

[54] SUN VISOR FOR MOTOR VEHICLES

[75] Inventors: Lothar Viertel, Altforweiler, Fed. Rep. of Germany; Patrick Welter, La Chambre, France

[73] Assignee: Gebr. Happich GmbH, Fed. Rep. of Germany

[21] Appl. No.: 921,309

[22] Filed: Jul. 29, 1992

[30] Foreign Application Priority Data

Jul. 30, 1991 [DE] Fed. Rep. of Germany ....... 4125185

[51] Int. Cl.$^5$ .............................................. B60Q 3/02
[52] U.S. Cl. .................... 362/135; 362/137; 362/141; 362/144; 296/97.2
[58] Field of Search ............... 362/74, 135, 137, 140, 362/141, 142, 144; 296/97.1, 97.2, 97.3

[56] References Cited

U.S. PATENT DOCUMENTS

| | | | |
|---|---|---|---|
| 4,686,609 | 8/1987 | Dykstra et al. | 362/141 |
| 4,764,852 | 8/1988 | Sakuma | 362/141 |
| 4,947,296 | 8/1990 | Takeuchi et al. | 362/144 |
| 4,973,020 | 11/1990 | Canadas | 296/97.2 |
| 5,117,337 | 5/1992 | Sakuma | 362/144 |

FOREIGN PATENT DOCUMENTS 0164612 6/1990 Japan ........................... 296/97.2

Primary Examiner—Ira S. Lazarus
Assistant Examiner—Y. Quactt
Attorney, Agent, or Firm—Ostrolenk, Faber, Gerb & Soffen

[57] ABSTRACT

A sun visor for motor vehicles has a trough in one large surface which supports a mirror and an illuminating device for the mirror. A swing cover over the trough exposes or hides the mirror. A light transmissive light panel in the trough is connected with the swing cover to selectively be moved over the electric illuminating device in the trough when the cover is opened and to be moved away from the illuminating device when the swing cover is closed down over the light panel. The light panel is swingably attached to the light cover and is slidingly guided in guide slots in the trough to both swing with respect to the trough and to translate with respect to the trough. A switch on the trough is activated by the translation of the light panel to turn on and off the electric illuminating device.

14 Claims, 4 Drawing Sheets

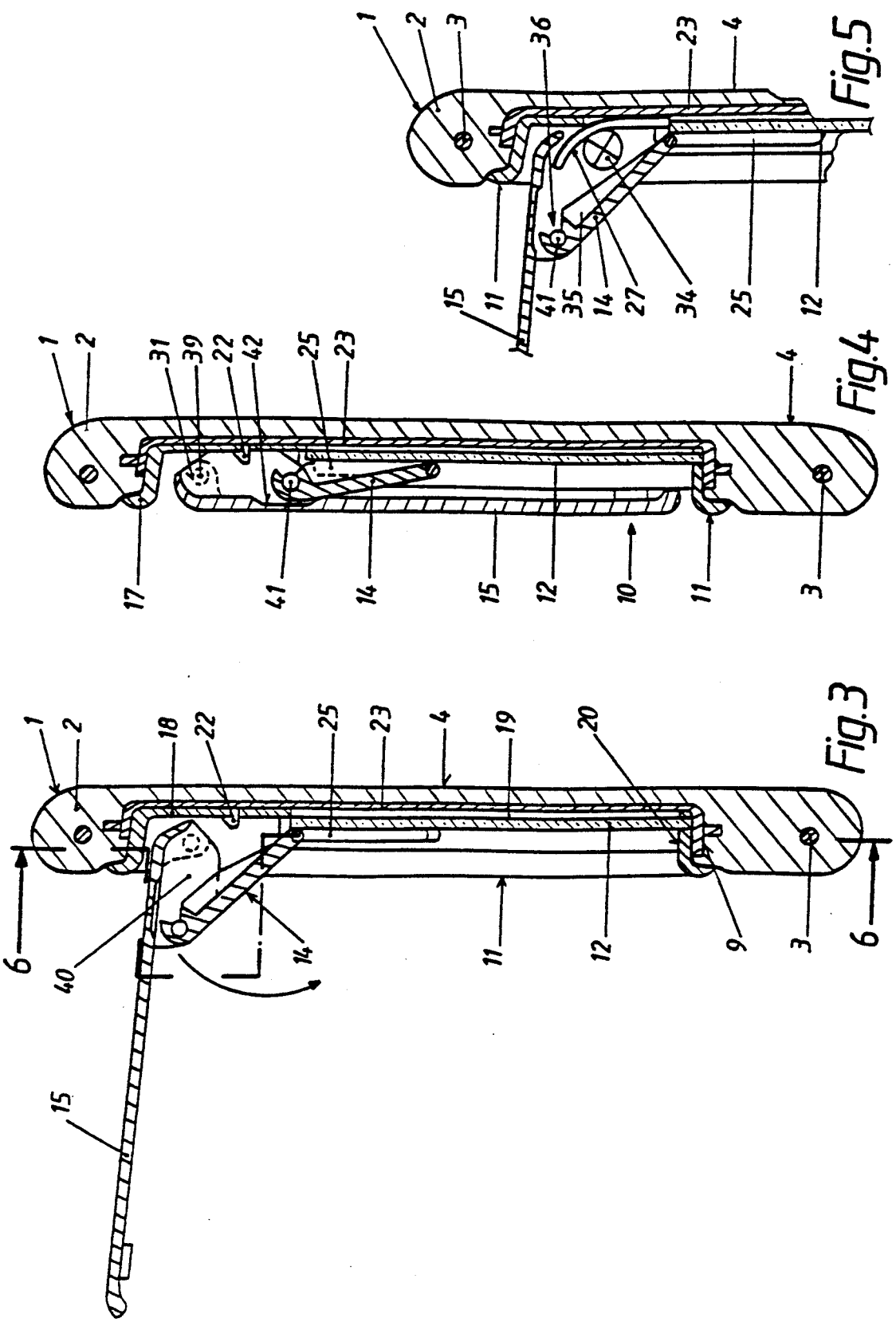

SUN VISOR FOR MOTOR VEHICLES

BACKGROUND OF THE INVENTION

The present invention relates to a sun visor for motor vehicles of the type having a mirror which is illuminated, and more particularly relates to the coverings over the mirror and to controlling the illumination. A sun visor of this type is known, for instance, from Federal Republic of Germany OS 27 03 447 which is equivalent to U.S. Pat. No. 4,174,864.

As compared with that prior art, the invention provides a sun visor having a sun visor body which is of particularly flat construction, and of particularly good appearance, despite its being provided with a mirror assembly.

SUMMARY OF THE INVENTION

A sun visor for motor vehicles according to the invention has a trough in one large surface. A mirror is positioned at the trough. An illuminating device for the mirror is deposited at one edge of the mirror. A swing cover over the trough is opened to expose or closed to hide the mirror. A light transmissive light panel in the trough is connected with the swing cover to be selectively moved over the electric illuminating device in the trough when the cover is opened and to be moved away from the illuminating device when the swing cover is closed over the light panel. The light panel is swingably attached to the swing cover and is slidingly guided in guide slots in the trough to both swing with respect to the trough and to translate with respect to the trough. A switch at the trough is activated by the translation of the light panel to turn on and off the electric illuminating device.

Other objects, features and advantages of the present invention will become apparent from the following description of the invention which refers to the accompanying drawings which show one embodiment of the invention.

BRIEF DESCRIPTION OF THE DRAWINGS

FIG. 3 is a section, approximately along the line G - H of FIG. 1, with the cover opened;

FIG. 4 is a section, approximately along the line G - H of FIG. 1, with the cover closed;

FIG. 5 is a partial section, approximately along the line I - K of FIG. 1, with the cover opened;

DETAILED DESCRIPTION OF THE INVENTION

Figure 1:
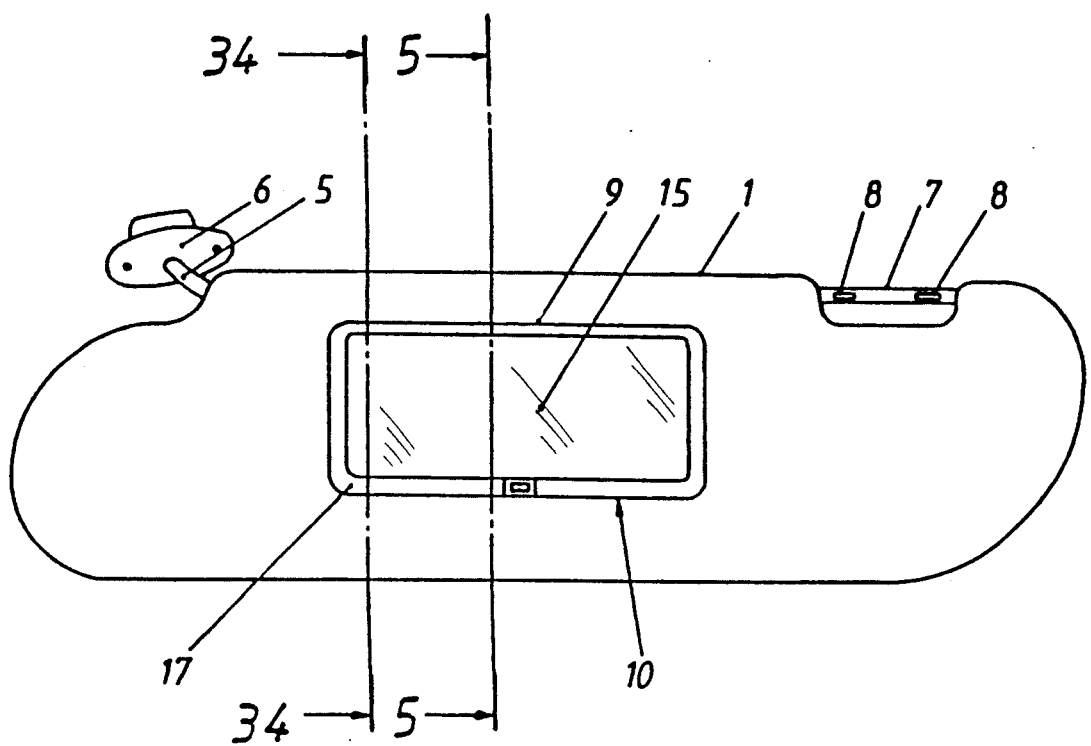
FIG. 1 is a front view of a sun visor with a mirror assembly arranged within the body of the sun visor.

The sun visor comprises a sun visor body 1 having a core 2 of foam material, a stiff wire reinforcement insert 3 embedded in the core 2, and a covering 4 of PVC foil, fabric, leather, or the like wrapped over the core. A shaft 5 is turnably arranged within the sun visor body core 2. A bracket 6 having mounting screw holes in it, is swingably arranged on the shaft 5 to serve for the swingable and turnable attachment of the visor body to the body of a motor vehicle. On the opposite end of the sun visor body, there is an outer support shaft 7, which serves for detachable and turnable suspension in an outer support bracket (not shown) on the body of the vehicle. One arm of the shaft 5 which is rotatably mounted in the sun visor body 1. That arm of the shaft and the outer support shaft 7 extend in alignment with each other along a region of the edge of the sun visor body and together form the axis for swinging of the sun visor down against a windshield in order to move it from the position of non-use in the region of the roof into the position of use in the region of the windshield. The sun visor can also be swung against a side window by disengaging the outer support shaft 7 from the outer support bracket and swinging the visor against the side window around the arm of the shaft 5 which is mounted in the bracket 6.

Electric contacts 8 are conventionally arranged on the outer support shaft 7. They cooperate with corresponding contacts in the outer support bracket to supply electric current to an illuminating device 13 which is arranged in the sun visor body 1. Electric current can also be fed to the illuminating device 13 in known manner through the shaft 5.

Figure 2:
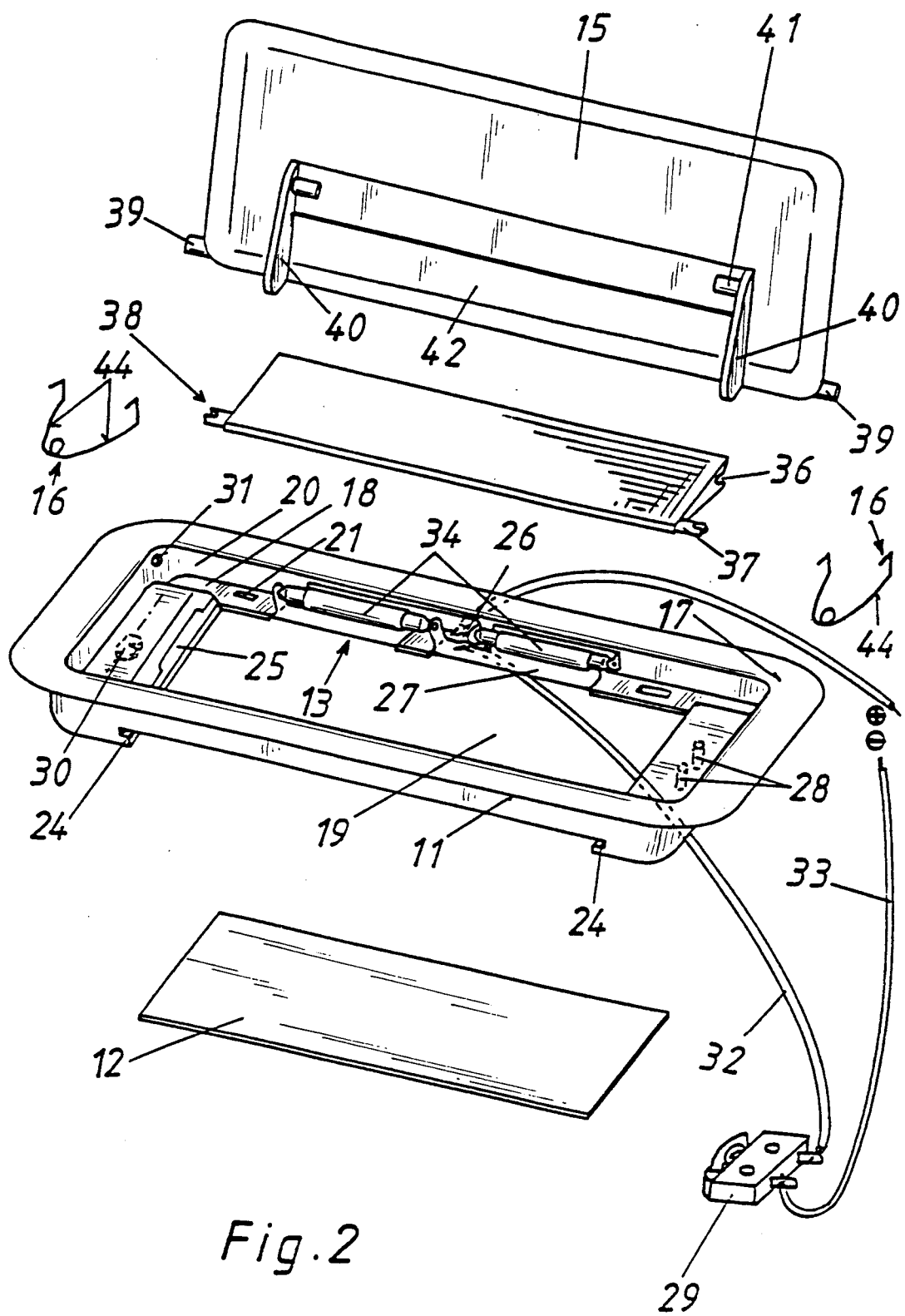
FIG. 2 is an exploded view of the mirror assembly.

Within the sun visor body 1, there is a recess 9 having a mirror assembly 10 inserted in it. As seen particularly in FIG. 2, the mirror assembly 10 comprises a trough part 11 and parts carried by it, including a mirror 12, an electric illuminating device including a light 13, a light panel 14, a swing cover 15, and spring cover operating wire springs 16.

The trough 11 is comprised of a plastic injection molding. It has a circumferential flange 17 which rests on the sun visor body 1, a bottom 18 having a relatively large opening 19 which reduces the quantity of material for the trough, and circumferential walls 20 which connect the circumferential flange 17 to the bottom 18. There are a plurality of spaced insertion openings 21 in the bottom 18 for receiving detent projections 22 which are present on a holding element 23 which is arranged in the visor body core 2. The trough 11, and thus the entire mirror assembly 10, is dependably held fast on the sun visor body 1 by the detent projections 22.

At its bottom, the trough 11 further has a dovetail shape insertion groove 24 for slidably receiving the mirror 12 and, in its lateral regions, the trough includes slide guides 25 which are developed as slots. Furthermore, tongues 26 are provided on the trough 11 to hold reflectors 27 which form parts of the illuminating device 13. Pins 28 are also provided on the trough for mounting a microswitch 29 which also forms part of the illuminating device. There is a receiving socket 30 for fastening one end of the wire springs 16. Mounting openings 31 receive and attach the swing cover 15.

The mirror 12 is preferably developed as a glass mirror. It is of rectangular shape. It is received in a protected manner in the region of the bottom 18 of the trough. The insertion grooves 24 represent merely one illustrative manner of holding the mirror. It is also possible to hold the mirror by clip projections, or the like, developed on the trough 11.

The electrical illuminating device 13 comprises the reflectors 27, the soldered electric wires 32, 33, the tubular bulbs 34 (for instance, 3 watt, 12 volt, 6 mm diameter) and the microswitch 29 through which the wire 32 passes. The free ends of the wires are electrically connected, for instance, to the contacts 8.

Figure 7:
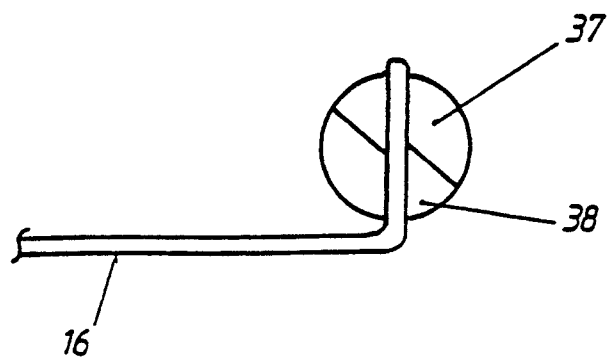
FIG. 7 shows a detail, seen in the direction of the arrow Z.

The light panel 14 is comprised of a light transmissive material, which is customary for this purpose, and preferably of plastic having a rippled surface. The light panel 14 is generally rectangular. It has edge strips 35 which protrude rearwardly at a right angle on its narrow sides. Each of the edge strips 35 has an undercut mounting opening 36 at its end region which is adjacent the upper edge of the light panel 14. Along the extension of the lower edge of the light panel, pins 37 are developed. They protrude from both sides of the panel and engage and are guided for translation in and along the slide guides 25 of the trough 11. Each pin 37 also holds one end of a wire spring 16. For this purpose, the pins 37 have insertion openings 38 whose special shape can be noted from FIG. 7. One of the pins 37 furthermore actuates the microswitch 29 fastened on the pins 28 upon the opening and closing of the swing cover 15 which causes the pins to translate along the slide guides 25. This respectively closes or interrupts the circuit to the illuminating device 13.

The swing cover 15 is also developed as a plastic injection molding. It is of approximately rectangular shape and of a size which makes it possible to cover the trough opening and the parts arranged in the trough 11. Approximately along the extension of its lower longitudinal edge, the swing cover 15 has two mounting pins 39, which are developed to protrude on both sides. They are intended to engage in the mounting holes 31 of the trough 11 and thereby define the axis of swing for the swing cover 15. On the rear of the swing cover 15, furthermore, adjacent its lower edge are mounting brackets 40 which protrude perpendicularly from the plane of the cover. They have mounting pins 41 developed on them which extend parallel to the mounting pins 39 and their free ends are directed towards each other. The distance between the mounting brackets 40 is adapted to the length of the light panel. Between the brackets 40 there extends a strip 42 of reduced cover wall thickness. The mounting pins 41 are intended for engagement in the mounting openings 36 of the light panel 14 and are disengaged from those openings for replacement of the bulb.

Each wire spring 16 has at least one central screw turn 43. Extending away from the screw turn 43 are two arms 44 with bent off ends which can be inserted, on the one hand, in the insertion openings of the receiving socket 30 and, on the other hand, into the insertion openings 38 of the pins 37 on the light panel 14.

Some individual parts of the sun visor described above, particularly the mirror assembly, are simple, easy and inexpensive to manufacture other parts, namely, the microswitch 29, the bulbs, and possibly also the springs 16, may be standard items which are easy to purchase. The assembly of the parts is done rapidly and easily, as now described.

The two reflectors 27 have the wires 32, 33 soldered to them. The soldering can also be replaced by use of plug connectors. The reflectors, with reversal, and of identical construction are first inserted into the trough 11 and are held by the tongues 26 formed thereon. The microswitch 29 is placed on the pins 28. The bulbs 34 are inserted. The mirror is placed into the insertion groove 24. The pins 37 of the light panel 14 are inserted into the slot guides 25 of the trough 11. The swing cover 15 is also attached to the trough 11 by a plug connection, namely by inserting the mounting pins 39 into the mounting openings 31. An articulated connection between the swing cover 15 and the light panel 14 can be produced by clipping the mounting pins 41 into the undercut mounting openings 36.

Figure 6:
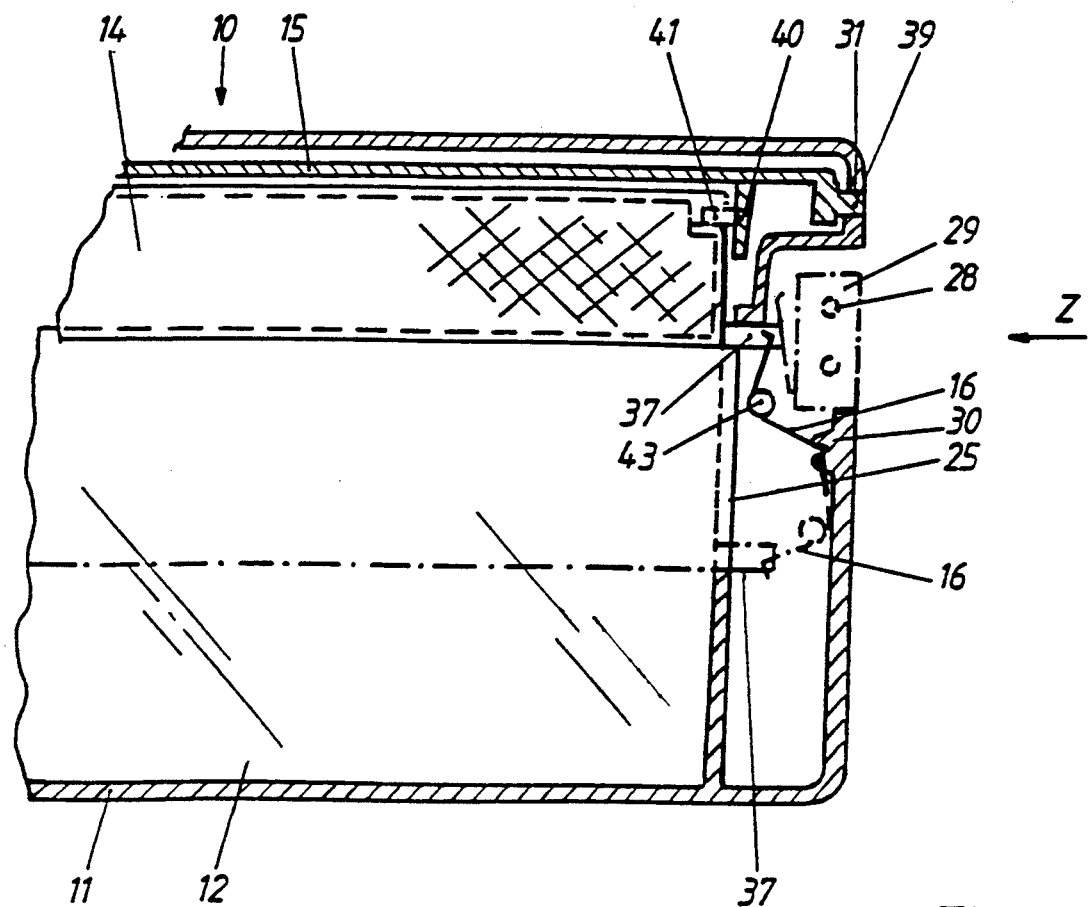
FIG. 6 is a section, approximately along the line A - F of FIG. 3.

The wire springs 16 are then mounted from the rear of the trough. The bent off ends of the arms are inserted into the slit openings in the receiving socket 30, on the one hand, and in the pins 37, on the other hand. The two wire springs 16 might also be referred to as dead center springs. They produce a continuous pressure upon the opening and closing of the cover as a result of their dimensioning and initial tension. They thus hold the swing cover 15 in either an open or a closed position. Upon the moving of the swing cover 15 from one end position into the other, the wire springs 16 change their position in a manner which can be noted from FIG. 6.

The mirror assembly 10 then need merely be inserted in the recess 9 of the sun-visor body 1, where it is locked on by the clip projections 22.

Upon opening and closing of the swing cover 15, the light panel 14 is positively guided by articulations on the swing cover 15 and on the trough 11. Upon the opening of the swing cover 15, the light panel 14 is moved outward and upward into a predetermined oblique position at which the reflectors 27 and bulbs 34 are covered. A lateral light barrier is produced by the mounting brackets 40, which thus serve a double function. Upon the closing of the swing cover 15, the light panel 14 is moved in and is approximately aligned in parallel between the mirror 12 and the swing cover 15, particularly below the illuminating device, which is necessary for compactness.

The sun visor described has the particular advantage that the mirror assembly is of substantially reduced structural height in the sun visor body, as compared with known assemblies, so that substantially thinner sun visors than previously customary can be made, as these are desired by consumers.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:
1. A sun visor for motor vehicles, comprising:
   a sun visor body having a broad side, and a recess formed in the broad side for receiving a mirror assembly;
   a mirror assembly installed in the sun visor body recess, the mirror assembly comprising:
   a part defining a trough;
   a mirror supported on the trough to be viewed from the broad side of the visor body, the mirror having a side edge;
   an electrically operated illuminating device above the side edge of the mirror;
   a light transmissive light panel which is movable to a covering position where the light panel covers over the illuminating device, such that the light from the illuminating device is transmitted through the light panel;
   a swing cover, means at the trough supporting the swing cover to swing into an open position exposing the mirror and the light panel and a closed position covering and hiding the mirror and the light panel;
   the light panel having one location thereon swingably supported on the cover and having another location swingably supported on the trough, such that with the swing cover closed, the light panel is covered by the swing cover and is moved by the swing cover to an uncovering position below the illuminating device, and with the swing cover swung open, the light panel is moved by the swing cover into the covering position to cover over the illuminating device for preventing direct view of the illuminating device while light from the illuminating device is transmitted through the light panel.

2. The sun visor of to claim 1, further comprising holding means for holding the swing cover in the selected one of the open and closed positions thereof.

3. The sun visor of to claim 1, wherein the light panel is swingably supported on the swing cover to move along with the swing cover, and attachment means swingably support the light panel to the trough for causing the light panel to both swing with respect to the trough and to translate along the trough as the swing cover is opened and closed.

4. The sun visor of claims 3, wherein the swing cover has a first axis of swing on the trough.

5. The sun visor of claims 4, wherein the light panel has an upper edge which is pivoted on the swing cover on a second axis there, and the second axis being parallel to and spaced away from the first axis of the swing cover.

6. The sun visor of claim 5, wherein the light panel is of rectangular shape.

7. The sun visor of claim 5, wherein the light panel has a lower edge region, and the attachment means which causes the light panel to translate comprises a translation guide in the trough for guiding the light panel lower edge region to translate.

8. The sun visor of claim 7, wherein the translation guide comprises slot guides developed in the trough and extending in the direction of translation of the light panel lower edge region as the swing cover is opened and closed; and pins protruding from the light panel at the lower edge region and engaging in the slot guides for guiding translation of the light panel.

9. The sun visor of claim 8, wherein the light panel is of rectangular shape;

the light panel having narrow sides, edge strips protruding from the narrow sides, the edge strips having mounting openings defined in the edge strips;

mounting pins on the swing cover which are placed to be received in the mounting openings of the edge strips.

10. The sun visor of claim 8, further comprising holding means for holding the swing cover in the selected one of the open and closed positions thereof.

11. The sun visor of claim 10, wherein the holding means comprises each of the protruding pins having an insertion opening; and a wire spring received in each of the insertion openings, the wire spring having one end received in the insertion opening, the wire spring having another end received in a side of the trough, the wire springs being so bent and arranged that they act upon the swing cover to hold the swing cover in a selected one of the closed and open positions over the light panel and beyond a dead center position.

12. The sun visor of claim 11, wherein the actuating means comprises a switch fastened on the trough and connected with the illuminating device for being actuated to turn on the illuminating device and to also be moved to turn off the illuminating device; and means on the light panel for engaging the switch to actuate the illuminating device when the swing cover is opened and the light panel is moved over the illuminating device and to turn off the illuminating device when the swing cover is closed.

13. The sun visor of claim 12 wherein the means for engaging the switch and the attachment means of the light panel both comprise a pin protruding from the light panel to means in the trough for causing the lower edge region of the light panel to translate with respect to the trough.

14. The sun visor of claim 3, further comprising actuating means on the trough and connected with the illuminating device for actuating the illuminating device to illuminate and to cease illuminating, the actuating means being positioned for being engaged by the light panel to be actuated to turn on the illuminating device when the swing cover is open and the light panel is moved to cover the illuminating device and to turn off the illuminating device when the swing cover is closed and the light panel is moved away from the illuminating device.

* * * * *